(12) United States Patent
Chan (10) Patent No.: US 7,814,212 B1
(45) Date of Patent: Oct. 12, 2010

(54) DATA DELIVERY SYSTEM USING LOCAL AND REMOTE COMMUNICATIONS

(76) Inventor: Hark C. Chan, P.O. Box 2203, Cupertino, CA (US) 95015-2203

( * ) Notice: Subject to any disclaimer, the term of this patent is extended or adjusted under 35 U.S.C. 154(b) by 118 days.

(21) Appl. No.: 11/760,088

(22) Filed: Jun. 8, 2007

Related U.S. Application Data (63) Continuation of application No. 09/836,397, filed on Apr. 17, 2001.

(60) Provisional application No. 60/200,260, filed on Apr. 28, 2000, provisional application No. 60/242,892, filed on Oct. 24, 2000, provisional application No. 60/246,337, filed on Nov. 7, 2000.

(51) Int. Cl.
*G06F 15/16* (2006.01)

(52) U.S. Cl. ........................... 709/227; 709/231

(58) Field of Classification Search ......... 709/202–207, 709/213–219, 223–245; 713/2, 153, 168, 713/169, 176, 182, 184; 380/28, 255, 259, 380/324
See application file for complete search history.

(56) References Cited

U.S. PATENT DOCUMENTS

| | | | | |
|---|---|---|---|---|
| 4,710,613 A | * | 12/1987 | Shigenaga | 235/380 |
| 4,720,860 A | * | 1/1988 | Weiss | 713/184 |
| 4,731,841 A | * | 3/1988 | Rosen et al. | 713/159 |
| 4,856,062 A | * | 8/1989 | Weiss | 713/184 |
| 4,885,778 A | | 12/1989 | Weiss | |
| 5,631,907 A | | 5/1997 | Guarneri et al. | |
| 5,657,388 A | | 8/1997 | Weiss | |
| 5,768,495 A | | 6/1998 | Campbell et al. | |
| 5,880,769 A | | 3/1999 | Nemirofsky et al. | |
| 5,953,047 A | | 9/1999 | Nemirofsky | |
| 5,973,683 A | | 10/1999 | Cragun et al. | |
| 6,029,045 A | | 2/2000 | Picco et al. | |
| 6,160,570 A | | 12/2000 | Sitnik | |
| 6,272,545 B1 | | 8/2001 | Flanagin et al. | |
| 6,377,982 B1 | * | 4/2002 | Rai et al. | 709/217 |
| 6,400,722 B1 | * | 6/2002 | Chuah et al. | 370/401 |
| 6,446,261 B1 | | 9/2002 | Rosser | |
| 6,449,272 B1 | * | 9/2002 | Chuah et al. | 370/389 |

(Continued)

FOREIGN PATENT DOCUMENTS

EP    0 713 335 A2    5/1996

(Continued)

*Primary Examiner*—Asad M Nawaz
*Assistant Examiner*—Sargon N Nano (57) ABSTRACT

Non-deterministic digital content can be generated frequently and automatically. The content can then be delivered to another device using local and remote communication channels. One type of digital content is access code for accessing a host (which, in many cases, is located in the home or office of a user). There is no need for the user to remember any number or perform any special operations. In one embodiment of the present invention, the host contains information or devices that the user wishes to access remotely using a portable unit. Either the host or portable unit (the originator) generates non-deterministic access codes at regular time intervals (e.g., once a day) using a random number generator. The non-deterministic codes are delivered to the counterpart (host or portable unit) of the originator using local communication. Because the user is likely to visit his/her home or office frequently, the codes can be updated frequently. When the user is far away from the host, he/she can use the codes stored in the portable unit to access the host.

10 Claims, 7 Drawing Sheets

U.S. PATENT DOCUMENTS

| | | |
|---|---|---|
| 6,478,220 B2 | 11/2002 | Seifert et al. |
| 6,738,362 B1 * | 5/2004 | Xu et al. .................... 370/329 |
| 6,757,696 B2 | 6/2004 | Multer et al. |
| 6,775,772 B1 | 8/2004 | Binding et al. |
| 6,836,765 B1 * | 12/2004 | Sussman .................... 705/75 |
| 6,853,988 B1 * | 2/2005 | Dickinson et al. ............ 705/75 |
| 6,862,617 B1 | 3/2005 | Wu |
| 6,938,076 B2 | 8/2005 | Meyer et al. |
| 6,970,916 B1 | 11/2005 | Philyaw |
| 6,990,468 B1 * | 1/2006 | Berson et al. ................. 705/52 |
| 7,028,186 B1 | 4/2006 | Stenman et al. |
| 7,120,606 B1 * | 10/2006 | Ranzini et al. ................ 705/64 |
| 7,165,041 B1 * | 1/2007 | Guheen et al. ................ 705/26 |
| 7,254,223 B1 * | 8/2007 | Henderson ............ 379/142.04 |
| 7,315,826 B1 * | 1/2008 | Guheen et al. ................. 705/7 |

FOREIGN PATENT DOCUMENTS

| | | |
|---|---|---|
| WO | WO 01/58156 A1 | 8/2001 |

* cited by examiner

DATA DELIVERY SYSTEM USING LOCAL AND REMOTE COMMUNICATIONS

CROSS-REFERENCE TO RELATED PROVISIONAL APPLICATION

This application is a continuation of application Ser. No. 09/836,397 filed Apr. 17, 2001, which claims the benefit of the following U.S. Provisional Applications: Ser. No. 60/200,260 filed Apr. 28, 2000; Ser. No. 60/242,892 filed Oct. 24, 2000; and Ser. No. 60/246,337 filed Nov. 7, 2000. All these patent applications are incorporated herein by reference.

FIELD OF THE INVENTION

This invention relates to data communication, and more specifically to a system and method to communicate locally using a local communication link and remotely via a wide-area network.

BACKGROUND OF THE INVENTION

Data communication is becoming an important part of daily life. One of the most notable examples is the Internet, from which people receive electronic mail and visit web pages. Another example is in telephone communication. Many homes now own cordless phones that use digital spread spectrum technology to communicate digitized voice information between a cordless phone and a base station. Cellular phones also advanced from analog mode to digital operation. Recently, engineers envision that computers, home entertainment products, and home appliances will be linked together using a home-based local area network. Devices connected to this network may communicate with the outside world via the Internet. All these development rely on advances in digital data communication.

As more and more devices communicate digitally and more information is delivered through various networks, it is important to develop better ways to handle communication between all the devices. An important requirement is to increase the security of data communication. One of the most commonly used security measures is password. Passwords are very easy to use and convenient because no special equipment is required. However, it is known that systems relying on passwords are insecure. On the other hand, if a security measure is very cumbersome, people will not use it. Consequently, it is desirable to develop a simple to use way to enhance secure communicate between digital devices.

SUMMARY OF THE INVENTION

The present invention involves a system that can automatically and frequently generate non-deterministic digital content. The content can be delivered using local and remote communication channels.

In one embodiment, the digital content is access codes to access a host (which, in many cases, is located in the home or office of a user). There is no need for the user to remember any number or perform any special operations. In one embodiment of the present invention, the host contains information or devices that the user wishes to access remotely using a portable unit. Either the host or portable unit (the originator) generates non-deterministic access codes at regular time intervals (e.g., once a day) using a random number generator. The non-deterministic codes are delivered to the counterpart (host or portable unit) of the originator using local communication. Because the user is likely to visit his/her home or office frequently, the codes can be updated frequently. When the user is far away from the host, he/she can use the codes stored in the portable unit to access the host.

It should be noted that the present invention is not limited to access codes. In general, digital content (e.g., algorithm, numbers, commands, video and audio data) can be generated in a non-deterministic manner. The digital content can be shared between a host and an associated portable unit using both local and remote communication links.

These and other features and advantages of the present invention are described by the following detailed description of the embodiments together with the accompanying drawings.

DETAILED DESCRIPTION OF THE INVENTION

The present invention comprises a novel data communication method and system using local and remote communication. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1A:
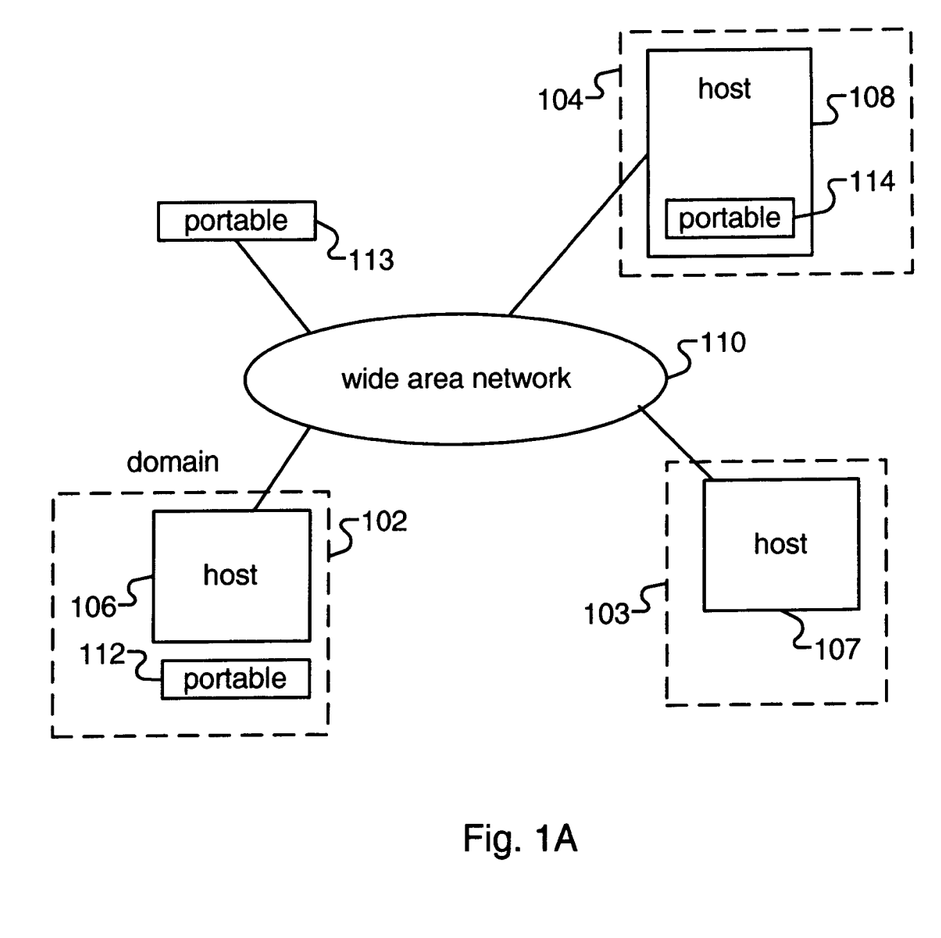
FIG. 1A is a schematic diagram of a system of the present invention.

FIG. 1A is a schematic diagram of a system of the present invention. It contains a plurality of domains (such as domains 102-104). The domains may be stationary (e.g., around a house or an office) or mobile (e.g., around a car). Each domain has a host (such as hosts 106-108 in domains 102-104, respectively). A host is an electrical system (to be described in more details below) that is installed inside a domain. Each host is associated with one or more portable access units (and conversely, each portable access unit can be associated with one or more hosts). In many situations, portable access units are simple portable devices designed to perform simple functions (such as cellular phone or personal digital assist) while hosts are more complex systems (such as personal computer or building automation controller). As an example, portable access units 112-114 are associated with hosts 106-108, respectively. In FIG. 1A, access unit 112 is positioned outside of its associated host 106 (but inside domain 102), portable access unit 113 is positioned far away from (and outside the domain of) its associated host 107, and access unit 114 is positioned inside its associated host 108. In FIG. 1A, each host can communicate locally with its associated access units inside its domain, and communicate remotely through a wide-area network 110 (such as the Internet) outside of its domain. Examples of local communication links are wired (e.g., using a so-called HomePNA phoneline network protocol) and wireless (e.g., using a so-called Bluetooth, HomeRF or the IEEE 802.11 wireless protocol). In the present invention, a domain can be defined as the geographic area in which a host can communicate with its associated portable access unit(s) locally. Thus, hosts 106 and 108 can communicate with portable access units 112 and 114 via local communication. Once outside of the domain, the host can communicate with its associated portable access unit(s) only through wide-area network 110. Thus, host 106 can communicate with portable access unit 113 via wide-area network 110.

Figure 1B:
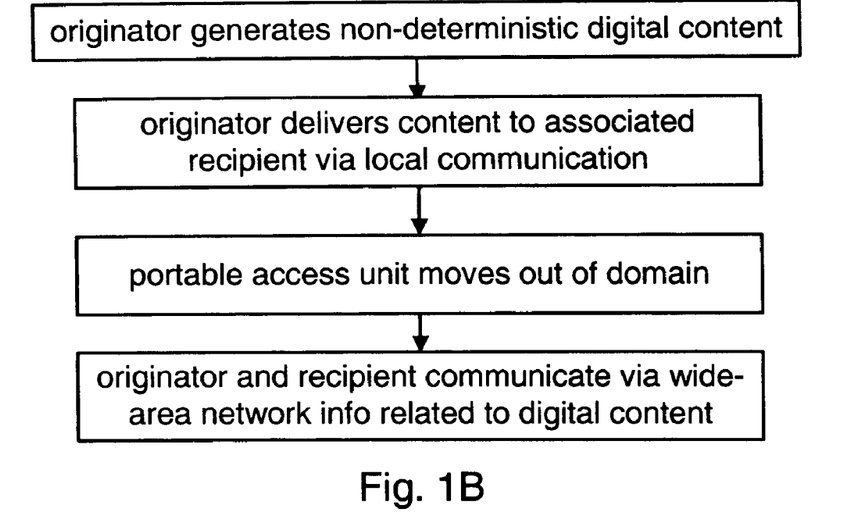
FIG. 1B is a flow chart showing the operation of the system of FIG. 1A.

The operation of system 100 is shown in FIG. 1B. Either a host or a portable access unit can generate non-deterministic digital content for use in the present invention. This host or portable access unit is called the "originator". The non-deterministic digital content includes data, commands and computer programs. It is generated using random numbers, or randomly selected from a list. The purpose is to create digital content in a way that is difficult to predict. The content is delivered to a recipient (either a host or a portable access unit, depending on the situation) associated with the originator via local communication. If the host is the originator, the associated recipient is the associated portable access unit. Similarly, if the portable access unit is the originator, the associated recipient is the associated host. When the portable access device later moves outside of the domain of its associated host, the host and portable access device may send the digital content (or information related to the digital content) to one another using wide-area network 110. In the case where the digital content is data, the data can be delivered between the originator and the recipient. In the case where the content is a computer program, the originator and recipient may also use the program to process certain input data to generate certain result. The input data and result can be communicated between the originator and recipient by wide-area network 110.

In one embodiment, the originator and/or the recipients contain memory to store the digital content.

It should be noted that the digital content may undergo a transformation in the host and/or associated portable access unit, as long as all the associated devices recognize the transformation. The word "transformation" means manipulation of the original content in accordance with certain algorithm. As an example, assuming that the digital content generated by an originator and received by a recipient is a number "12", both the originator and recipient may attach another number (e.g., "ab") to the digital content. The final number "ab12" is a transformation of the original digital content. During remote communication, the number "ab12" may be used instead of the original digital content. As another example, the content may be shifted (e.g., alphanumeric characters are shifted by two, so that "1" becomes "3" and "2" becomes "4"). The shifting may also follow a look-up-table. Other more complicated changes may also be used.

In order to present a concrete description of how system 100 can be used, a secure remote access system is described in detail. In this application, the above-mentioned non-deterministic digital content is an important component for a user to remotely gain access to a host. In a simple case, the non-deterministic digital content is a randomly generated number. In a more complex case, the non-deterministic digital content can be a randomly selected algorithm.

Figure 2A:
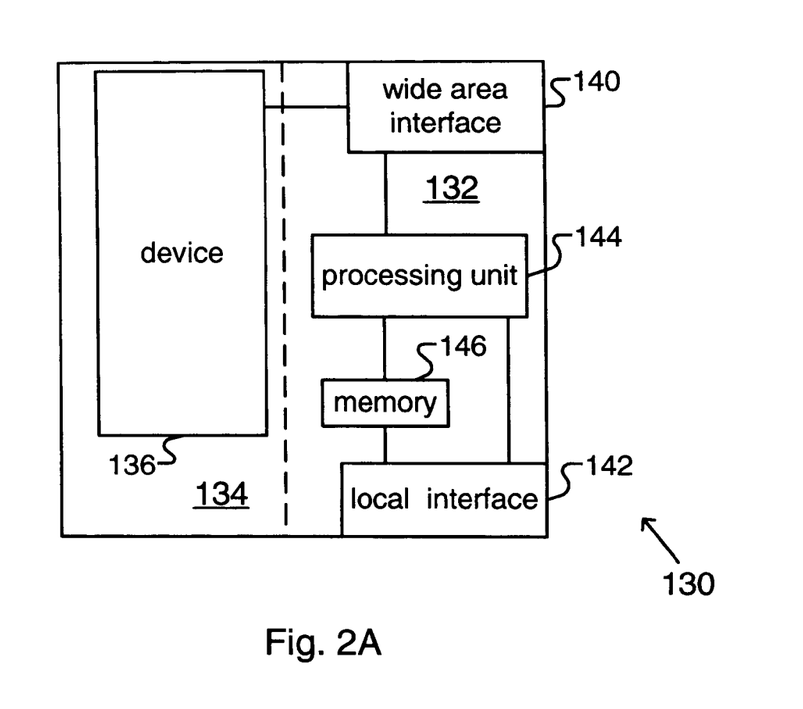
FIG. 2A is a block diagram of one embodiment of a host of the present invention.

FIG. 2A is a drawing showing a block diagram of one embodiment of a host 130 of the present invention. Host 130 contains an access section 132 and a device section 134. Device section 134 contains one or more devices (such as device 136) that a user wishes to remotely send information to or receive information from. Access section 132 determines whether a remote apparatus is allowed to communication with device section 134 via wide-area network 110.

Access section 132 contains a wide-area interface 140 for communicating with wide-area network 110. Access section 132 also contains a local interface 142 for short distance local communication (i.e., within a domain) with associated portable access units. Access section 132 contains a processing unit 144 (containing processor, RAM, ROM, etc.) that can perform data processing functions. Access section 132 also contains a memory 146 for storing non-deterministic digital content. If the remote apparatus is determined to be an authorized apparatus (e.g., one of its associated portable access units), processing unit 144 issues a command to wide-area interface 140 to allow device section 134 to communicate with the remote apparatus. Because the workload of processing unit 144 is light and the size of the digital content is typically small, there may not be a need to have a separate processing unit and memory to implement the present invention, i.e., processing unit 144 and memory 146 may be shared with other parts of host 130 (e.g., device 136).

There are various ways to remotely identify authorized apparatuses using the digital content. For example, a digital code (called herein the "access code") can be used. Thus, if the access code received from a remote apparatus matches the digital content stored in memory 146, the apparatus is considered authorized. Alternatively, the digital content may consists of an algorithm designed for the purpose of authenticating a remote apparatus to host 130. If it is determined that both the host and the apparatus contain the same algorithm (e.g., by comparing the result of computation based on a randomly selected input), the apparatus is considered authorized. As explained in detail below, the present invention allows the digital content to change frequently (e.g., once a day) and automatically. There is no need for a user to remember a code (e.g., password) or perform any extra operation. As a result, the security of the system can be improved.

The above operations (matching and comparing) can be performed by processing unit 144. Thus, unit 144 functions as a comparator.

After an authorized apparatus is identified, the apparatus can send commands to device 136 ordering it to perform certain functions. In one embodiment of the present invention, these commands may be transformed. In the present invention, the transformation may be changed frequently. The transformation algorithm can be stored in memory 146.

Figure 2B:
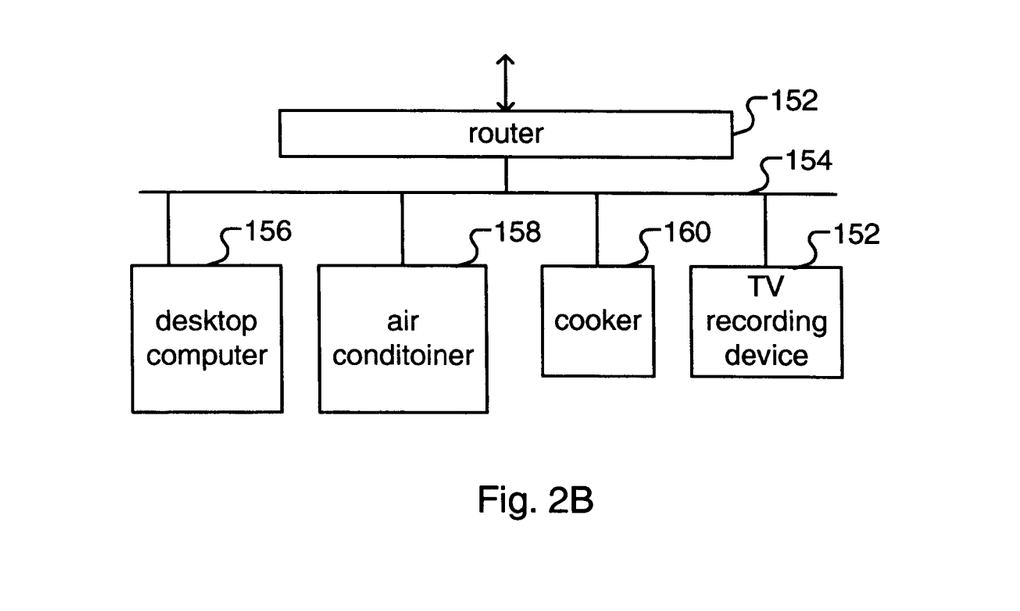
FIG. 2B is a block diagram of a device section of the present invention.

FIG. 2B is a block diagram of an embodiment of device section 134. It contains a router 152 for routing communication to several devices in device section 134 via a local area network 154 (e.g., LonWorks in homes or Ethernet in offices). Examples of devices are a desktop computer 156, an air conditioner 158, a cooker 160 and a video recorder 162. In an embodiment of the present invention, each device has a distinct identification number. Thus, it is possible for the associated portable access unit to communicate with individual device. Each device may have its own set of commands. Each device may also have its own access code and access algorithm. In this case, memory 146 needs to store these information and their corresponding device identification number.

Figure 3A:
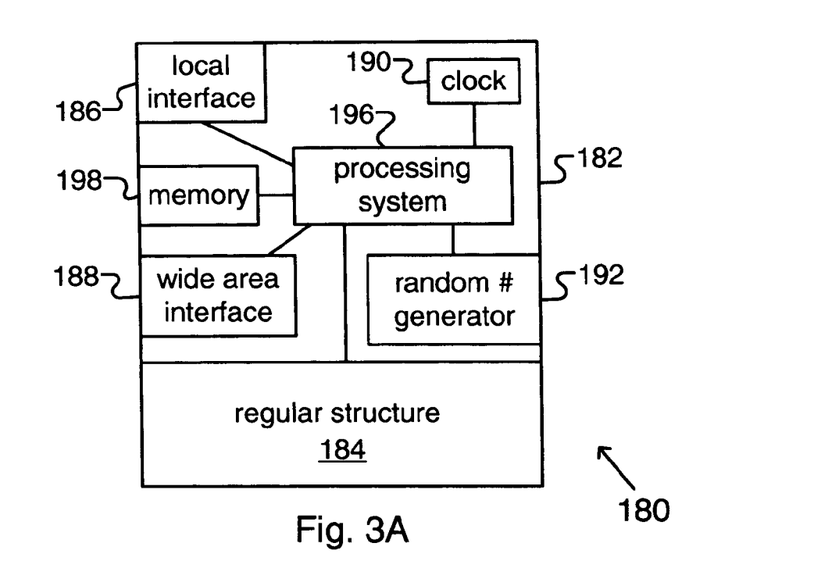
FIG. 3A is a block diagram of a portable access unit of the present invention.

FIG. 3A is a block diagram of a portable access unit 180 of the present invention. It contains an access control section 182 and a regular structure section 184. Regular structure section 184 contains structures that provide regular functionalities. As an example, if portable access unit 180 is a cellular telephone of the present invention, regular structure section 184 would contain structure found in a conventional cellular phone (such as a radio frequency transceiver, memory, processor, display, user interface, etc.). Access control section 182 contains a local interface 186 for communication with local interface 142 of host 130 and a wide are interface 188 for communication with wide-area network 110. It also contains a clock 190 and a random number generator 192. Random number generator 192 could be a hardware component or an algorithm executed by a processing system 196. If generator 192 is a hardware component, it could be a digital device generating random digital numbers or an analog device generating random analog values and then converted to digital numbers. Processing system 196 then generates digital content using the random numbers generated by random number generator 192. The generation mechanism could be as simple as equating the non-deterministic digital content with a random number, or selecting one of several predetermined numbers or algorithms using a random number. Portable access unit 180 also contains a memory 198 for storing the digital content. Because the workload of processing system 196 is light and the size requirement of memory 198 is small, these components can be shared with regular structure 184 so as to reduce costs.

In one embodiment of the present invention, each device in the host is associated with a distinct digital content. In this case, memory 198 is used to store a table of digital contents and their corresponding device identification numbers.

Figure 4:
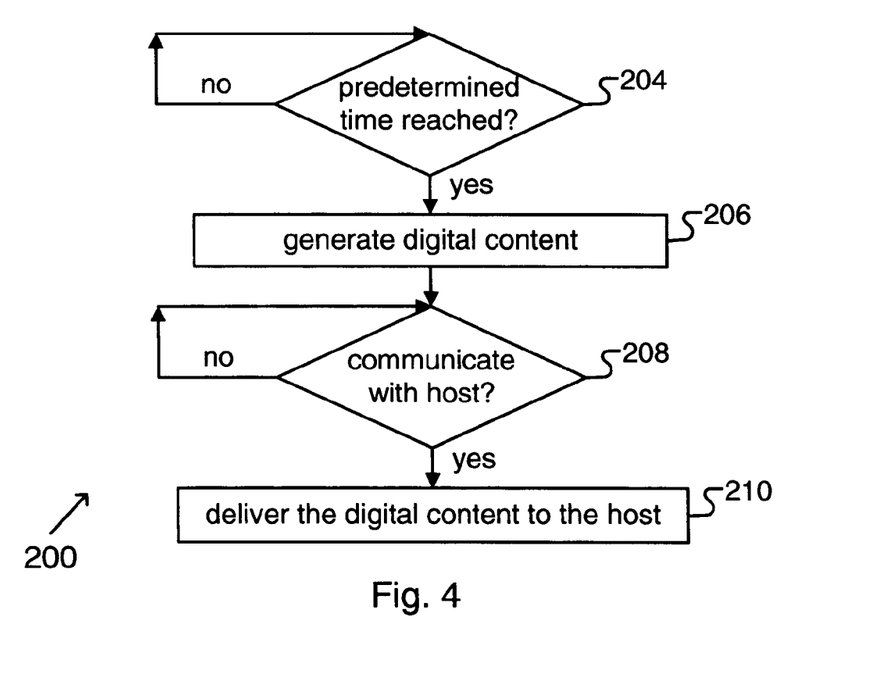
FIG. 4 is a flow chart showing the creating and dissemination of digital content of the present invention.

The operation of the present invention is now described. In order to access the device section of a host remotely via the wide-area network, the host must verify that the portable access unit has the correct digital content. In this part of the disclosure, a method (shown as a flow chart 200 in FIG. 4) of creating the digital content and disseminating the content to the access section of the host is described. Portable access unit 180 and host 130 are used as examples. Clock 190 in unit 180 provides a mechanism for access control section 182 to ascertain the correct time. Unit 180 checks to see if a predetermined time (e.g., midnight every day) is reached (step 204). When reached, processing system 196 and random number generator 192 generate a digital content (step 206). Portable access unit 180 determines whether it is able to communicate with host 130 using local interfaces 186 and 142 (step 208). If the answer is negative, unit 180 will periodically attempt to establish local communication with host 130. If the answer is positive, unit 180 will deliver the digital content to host 130 (step 210) via local interfaces 186 and 142.

Portable access unit 180 and host 130 may also authenticate themselves using conventional authentication methods (e.g., deterministic passwords). Thus, when an alien portable access unit enters the domain associated with host 130, it will not be able to exchange digital content with host 130.

In the present invention, portable access unit 180 is preferably an apparatus normally carried by the owner of host 130. For example, if portable access unit 180 is a cellular phone, the owner normally carries it to his/her car, house, and office. Local interfaces 142 and 186 are designed for short distance communication (inside a domain). Thus, when host 130 receives the digital content, it is highly likely that the digital content comes from an authorized source. As a result, it may be acceptable to use a less secure access mechanism (e.g., a regular password that does not change frequently). Note that the same apparatus can be the portable access unit of more than one host. Thus, the cellular phone can be the portable access unit of a house and a car. Another advantage of the present invention is that the digital contents change frequently, and are transferred automatically between a portable access unit and its associated host(s) at predetermined times.

In one embodiment of the present invention, portable access unit 180 generates a digital content for each device in device section 134 of host 130. In FIG. 2B, four devices are shown. Thus, random number generator 192 generates four random numbers and processing system 196 generates four digital contents. Portable access unit 180 delivers the digital content together with the identification number of the corresponding device to host 130. As mentioned above, the commands may be transformed. The transformation may also be performed in a non-deterministic manner. Thus, the digital representation of the commands may be changed frequently.

Figure 5:
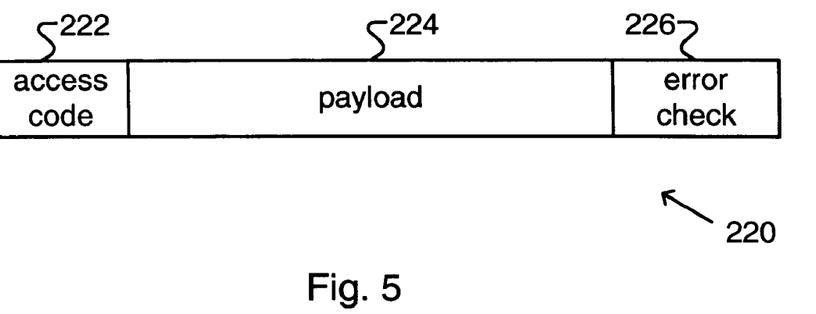
FIG. 5 shows a simplified schematic diagram of a data packet of the present invention.

When portable access unit 180 is outside of the domain, it communicates with host 130 via wide-area network 110 using wide area interface 188. In one embodiment of the present invention, unit 180 delivers the access code to host 130. FIG. 5 shows a simplified schematic diagram of a data packet 220 of the present invention. It contains an access code portion 222 and a payload portion 224. Packet 220 may also contain an error check portion 226 that allows the recipient to determine whether the packet contains errors. The device identification number may also be included in access code portion 222 of packet 220. Host 130 allows access by portable access unit 180 only if it contains a correct access code. Because the access code is changed frequently (e.g., once a day), the security of the present invention is improved. If the digital content is a computer program, the access code portion 222 may be used to carry the input data or computational result discussed in connection with FIG. 1B.

Figure 2C:
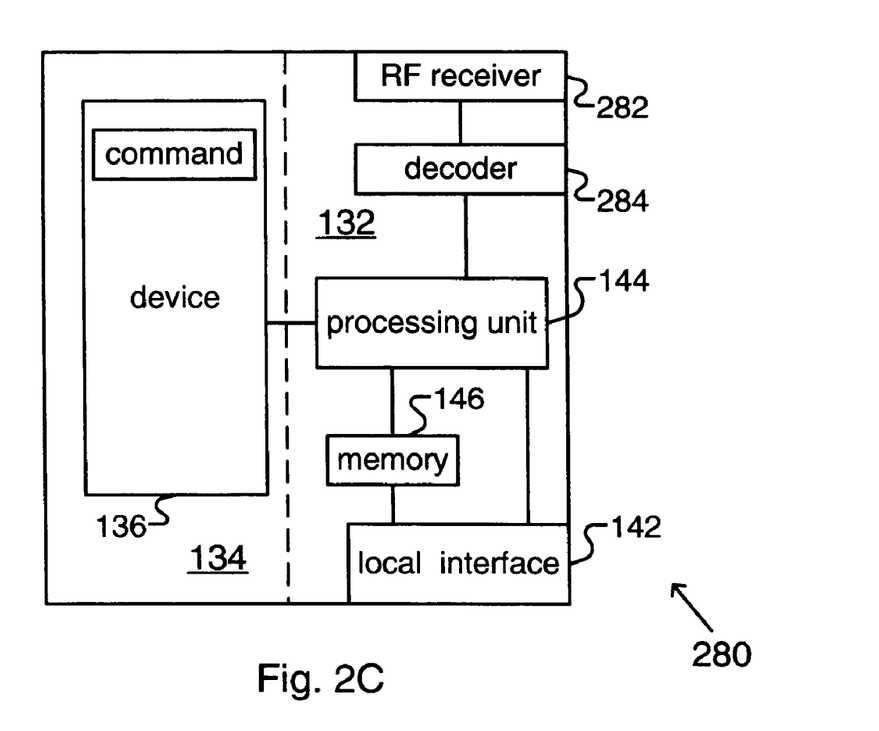
FIG. 2C shows another embodiment of a host of the present invention.

In the above-described embodiment of FIGS. 2 and 3A, the random number generator and clock are located in the portable access unit. In a different embodiment, the random number generator and clock can be located in the host. Further, once a random number is generated, either the host or the portable access unit can generate the digital content and deliver it to the associated recipient.

As a further embodiment of portable access unit, the wide-area interface is built into the regular structure section. As an example, a conventional cellular telephone can be the regular structure section of the portable access unit of the present invention. Many cellular telephones contain an Internet access component. This component can be used as the wide-area interface of the present invention. In this way, the cost of the portable access unit can be reduced.

Figure 3B:
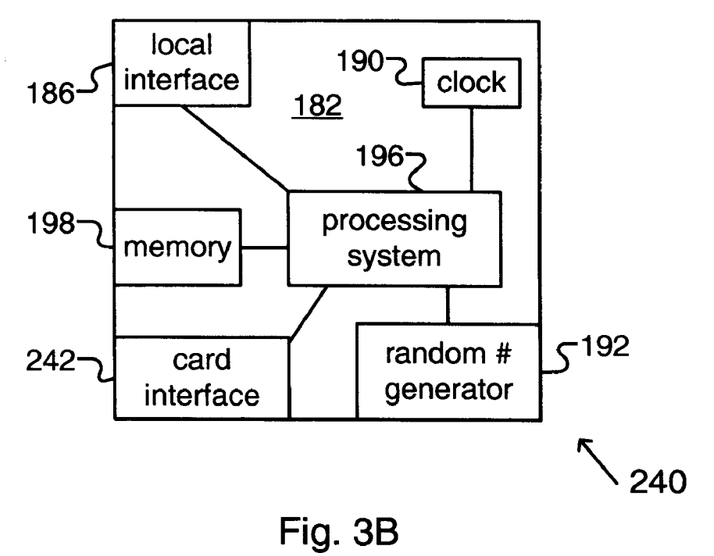
FIG. 3B is a block diagram of a device that can be used to generate digital content of the present invention.

In an alternative embodiment of the present invention, a portable memory card (such as smart card or memory card) can be used to carry the non-deterministic digital content. FIG. 3B shows a unit 240 that can be used to generate the digital content of this embodiment. Elements that are substantially the same in FIGS. 3A and 3B have the same reference numerals. Unit 240 contains a card interface 242 that can be used to write the digital content onto a memory card. In this embodiment, unit 240 does not need to be portable, and may be stationed inside its associated domain. Only the memory card needs to be carried by its owner to locations outside of the domain. At a remote site, a card interface can be used to read the digital content. This card interface is connected to a data processing machine (e.g., computer, game console, set-top box, etc.) that has a wide area interface. The digital content in the memory card can be used to access the host associated with unit 240.

In some cases, an owner of the host and portable access unit may want to change the digital content after a successful remote access session. One advantage of this arrangement is that a potential intruder cannot spy on the digital content during a remote access session, and use the same content to access the host soon after the owner finishes the access session. In this embodiment, both the host and its associated portable access unit contain an algorithm. This algorithm is used to transform the digital content to another content. As a result, the digital content can be changed automatically with each successful access. This algorithm may also be non-deterministic, and can be generated using the method of the present invention.

Figure 6:
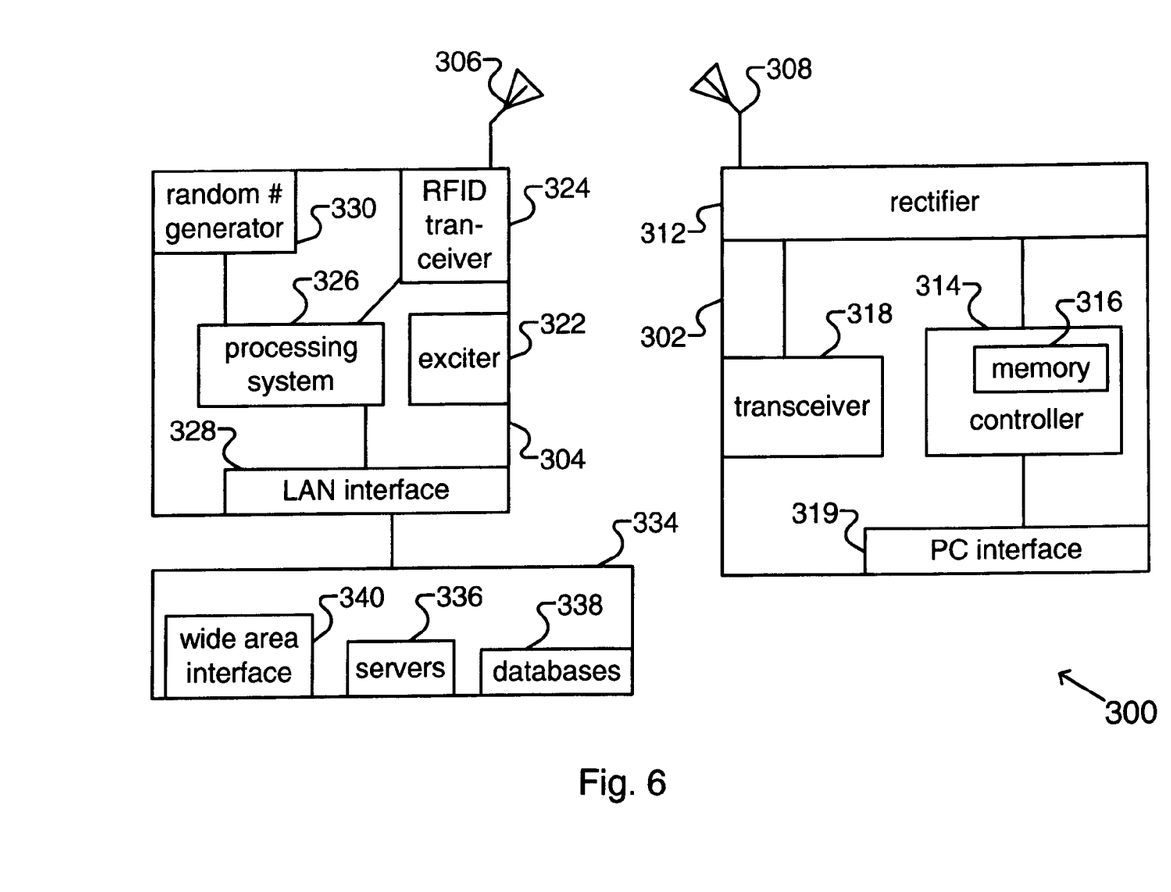
FIG. 6 is a block diagram of a radio frequency identification tag system of the present invention.

An embodiment of the present invention using a radio frequency identification (RFID) tag system 300 is shown in FIG. 6. RFID tags are frequently used for personal identification in automated gate sentry applications protecting secured buildings. Information stored in the tags can serve to identify the persons accessing a building. In the present invention, this system can be used to provide secure remote access to computer resources of a company. FIG. 5 shows a tag 302 and an interrogator 304 that can conduct local communication with each other using antennas 306 and 308. Tag 302 contains a rectifier and power circuit 312 that can remotely receive power from interrogator 304 (using inductive or electrostatic coupling), rectify the received power, and power up the various components inside tag 302. Tag 302 contains a controller 314 that controls the interaction between tag 302 and interrogator 304. Controller 314 contains a memory 316 that stores a tag identification number and an access identification value. In the present invention, this access identification value may be changed when tag 302 is in the proximity of interrogator 304. Tag 302 also contains a transceiver circuit 318. This circuit allows tag 302 to communicate digital information with interrogator 304.

Interrogator 304 contains an exciter 322 that can provide power to rectifier and power circuit 312 of tag 302 when tag 302 is proximately located to interrogator 304. Interrogator 304 contains a transceiver 324 that can communicate digital information with tag 302. Interrogator 304 contains a processing system 326 and a local area network (LAN) interface 328. LAN interface 328 connects interrogator 304 to a company computer system 334. Processing system 326 controls the communication between interrogator 304 and tag 302 and between interrogator 304 and computer system 334. Computer system 334 contains servers 336 and databases 338. Employees of the company can remotely access computer system 334 through a wide area interface 340. In the present invention, a random number generator 330 is used to generate a random access identification value when interrogator 334 senses that a tag (such as tag 302) is nearby. This access value is transmitted to tag 302 and stored in memory 316. The value is also stored in databases 338. The holder of tag 302 can travel with the tag, and the new access identification value can be used by the holder to remotely access computer system 334. For example, if the holder wishes to access computer 334 at home, the home computer will have a device that can read the access identification value stored in memory 316. This value will be used by the home computer to convince computer system 334 that the home computer is used by an authorized employee of the company. In this embodiment of the invention, tag 302 contains a PC interface 319 for easy interface with a personal computer (PC). Examples of PC interface 319 are USB port and IEEE 1394 ("Firewire") port. One characteristic of these ports is that power is supplied by the PC. Thus, tag 302 does not need to have an independent power source.

It should be noted that random number generator 330 may reside in interrogator 334 or computer system 334. In some cases, it is also desirable to combine a password system with the access identification value to further improve the security of the present invention.

Figure 7:
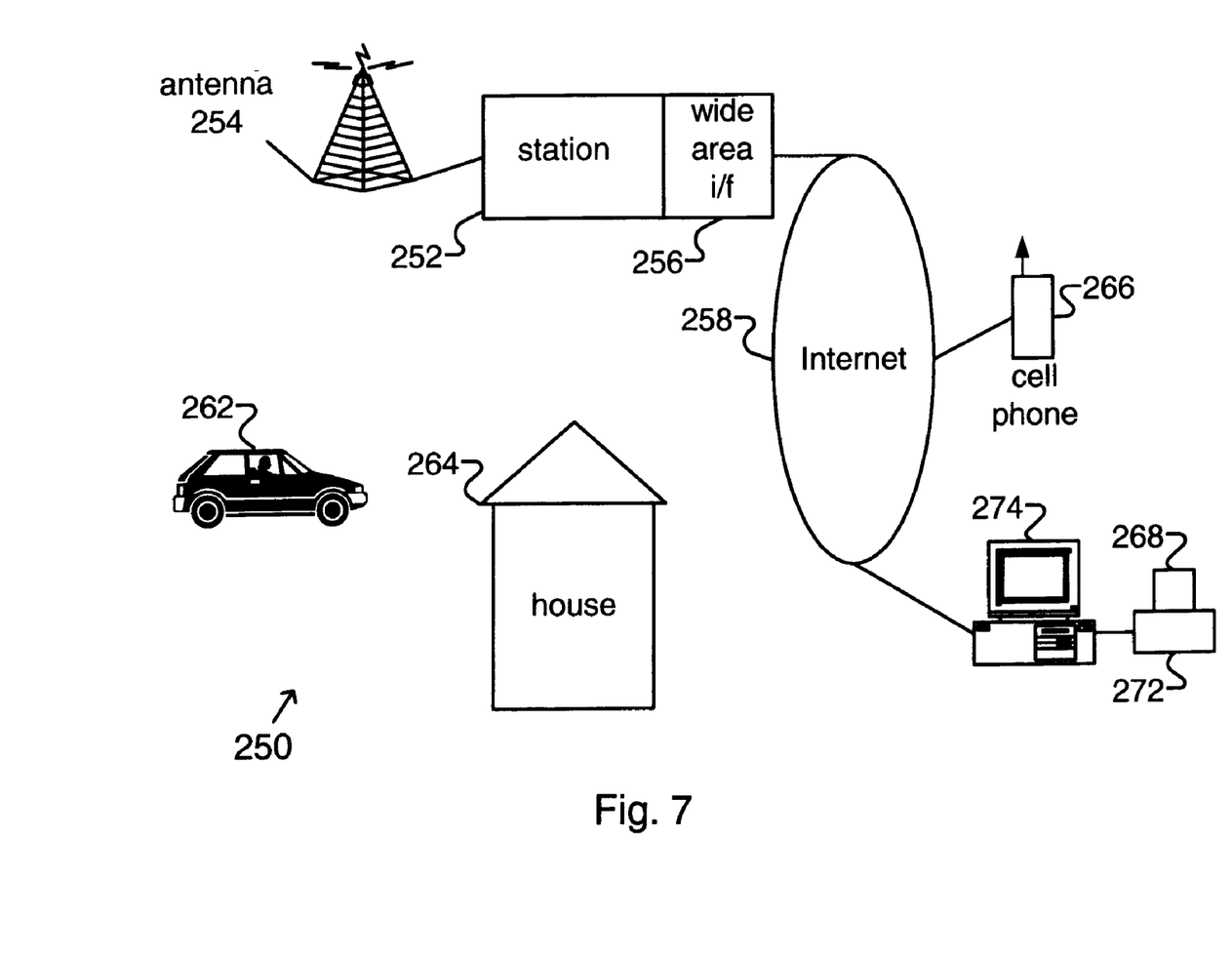
FIG. 7 is a block diagram of a system of the present invention in which broadcasting is used to deliver digital information.

FIG. 7 shows an alternative system 250 of the present invention in which part of the wide-area network is a broadcast system. System 250 contains a broadcast station 252 broadcasting radio frequency signals using an antenna 254 to a large number of recipients. Station 252 is also connected to a wide-area network (such as the Internet 258) using a wide-area network interface 256. Broadcast station 252 can broadcast digital data (encoded in radio frequency signals) efficiently to a large number of recipients, such as a car 262 and a house 264. The advantage of broadcasting is that the digital data can be received by movable recipients, such as car 262, over a wide geographic area. The disadvantage is that it is a one-way communication. Thus, broadcasting is a good communication medium if a user wants to send commands to a movable recipient or a large number of recipients, or to a single recipient that accepts simple commands (e.g., turn on an air conditioner or heater).

A simple broadcasting system that uses access codes to send commands is now described. A portable access unit (such as a cellular phone 266 and a memory card 268) first establishes non-deterministic access codes locally using the above-described method. The user then carries the portable access unit to other places (e.g., his/her office). If a memory card is used, the user may insert the memory card 268 in a card interface 272, which is connected to a computer 274. Computer 274 can communicate with broadcast station 252 using Internet 258. If a cellular phone is used, the user can use his/her cellular phone 266 (which is Internet enabled) to establish communication with broadcast station 252.

Each host needs to register with broadcast station 252, and a host identification is assigned to the host. This identification is transferred to the associated portable access units of the host using local communication.

In operation, the user enters a command (e.g., turn on a device) and a device identification (e.g., "12345" for a heater) to cellular phone 266 or computer 274. Cellular phone 266 or computer 274 retrieves the access code, and delivers the access code, device identification, host identification and command to broadcast station 252. Broadcast station 252 encodes these data (i.e., access code, device ID and command) into radio frequency signals, and broadcast the signals to surrounding areas. The host identified by the identification will authenticate the access code. The host will execute the command after verified that the command is sent by its owner.

FIG. 2C shows an embodiment of a host 280 of the present invention. Elements that are common in FIGS. 2A and 2C have the same reference numerals. Host 280 needs to have a radio frequency receiver 282 for receiving the broadcast signals. A decoder 284 is also needed to recover the data encoded into the radio frequency signal. The data is sent to processing unit 144. In the present embodiment, a single processing unit 144 may be used to process the access code, commands and control the devices. This is because the devices are simple and the commands are typically very short, thus do not require much processing power. As a result, the cost of the host can be reduced.

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. A communication system comprising:

a set of communication devices comprising at least a first and a second communication device, the first communication device having a wide area interface, the second communication device having a radio frequency receiver, each of the first and the second communication devices having a local interface that can communicate in a distance substantially shorter than that of the wide area interface;

one of the first and the second communication devices generating a non-deterministic digital content and delivering using the local interfaces of the first and the second communication devices the non-deterministic digital content to another of the first and the second communication devices;

a remote site located remotely from the first and the second communication devices, the remote site having a wide area interface that can receive the non-deterministic digital content and a first set of digital data from the wide area interface of the first communication device, subsequently the remote site transmitting radio frequency signal encoded with a second set of digital data, the second set of digital data comprising at least the non-deterministic digital data and the first set of digital data; and the second communication device receiving the radio frequency signal using the radio frequency receiver and recovering the first set of digital data and non-deterministic digital content, the second communication device using the non-deterministic digital content to verify that the first set of digital data is sent by the first communication device.

2. The communication system of claim 1 wherein the non-deterministic digital content comprises a digital code.

3. The communication system of claim 1 wherein the non-deterministic digital content comprises an algorithm.

4. The communication system of claim 1 wherein the one of the first and the second communication devices can detect a presence of the another of the first and the second communication devices and delivers the non-deterministic digital content without user action.

5. The communication system of claim 1 wherein at least one of the first and the second communication devices comprises a cellular phone.

6. The communication system of claim 1 wherein the first communication device comprises an identification code, and wherein the remote site receives the identification code from the first communication device.

7. The communication system of claim 1 wherein the remote site comprises a broadcast station for broadcasting the radio frequency signal to the set of communication devices.

8. The communication system of claim 1 wherein the local interfaces of the first and the second communication devices comprise wireless interfaces.

9. The communication system of claim 1 wherein the one of the first and the second communication devices periodically attempts to establish local communication with the another of the first and the second communication devices if the delivering of the non-deterministic digital content is unsuccessful.

10. The communication system of claim 1 wherein at least one member of the set of communication devices contains a component for communicating with an appliance, and wherein the first set of digital data contains a command for the appliance.

* * * * *